UNITED STATES PATENT OFFICE.

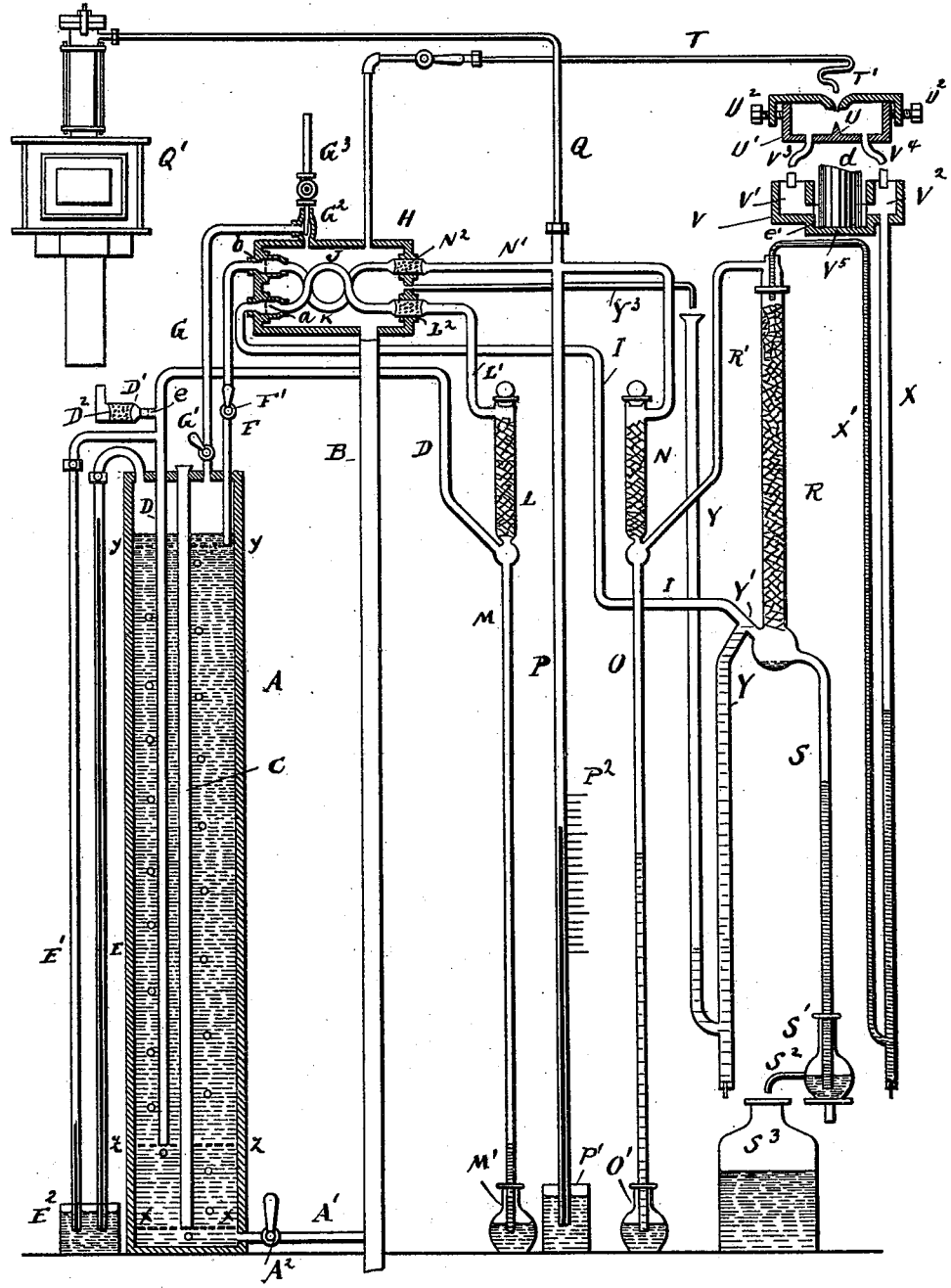

ALFRED STEINBART, OF CARLSTADT, AND EDWARD A. UEHLING, OF NEWARK, NEW JERSEY.

APPARATUS FOR DETERMINING CONSTITUENTS OF GASES.

SPECIFICATION forming part of Letters Patent No. 637,488, dated November 21, 1899.

Application filed May 4, 1898. Serial No. 679,673. (No model.)

*To all whom it may concern:*

Be it known that we, ALFRED STEINBART, a native of Germany, (but having declared my intention of becoming a citizen of the United States,) and a resident of Carlstadt, in the county of Bergen, and EDWARD A. UEHLING, a citizen of the United States, and a resident of Newark, in the county of Essex, State of New Jersey, have invented certain new and useful Improvements in Apparatus for Determining, Indicating, and Recording the Constituents of a Gas, of which the following is a specification.

This invention relates to a new and improved apparatus for determining, indicating, and recording the amount of any desired constituents of a gas—for example, the amount of carbon dioxid in the gases of combustion; and the object of our invention is to provide a new and improved apparatus of this kind which is exact, reliable, and in no way influenced by changes in temperature or by the tension of the gases or by atmospheric changes and which apparatus is not apt to get out of order or become clogged by the chemicals used.

In the accompanying drawing, forming a part of this specification, a vertical diagrammatical view of our improved apparatus for determining, indicating, and recording the constituents of gases is shown.

This apparatus is based on the laws governing the flow of a gas through fine apertures. If two such fine apertures form, respectively, the inlet and outlet openings of a chamber or a tube system and a uniform suction is maintained in another chamber communicating with outlet-opening of said tube system, gas is drawn through said outlet-opening, creating suction in the tube system, which suction in turn causes gas to flow into the tube system through the inlet-opening. The velocity with which the gas enters through said inlet-opening depends upon the suction in the tube system, and the velocity with which the gas passes out of the tube system depends upon the excess of suction in the chamber communicating with the outlet-opening over the suction in the tube system—that is, upon the effective suction in the chamber communicating with the outlet-opening. As the suction in the tube system increases the effective suction decreases, and hence the velocity of the gas entering the tube system through the inlet-opening increases, while the velocity of the gas passing out of the tube system through the outlet-opening decreases until the same quantity of gas enters the tube system at the inlet-opening as passes out through the outlet-opening. As soon as this occurs no further change of suction takes place in the tube system, providing the gas entering the tube system through the inlet-opening and passing out of the tube system through the outlet-opening is maintained at the same temperature. If from the constant stream of gas flowing through the tube system between the fine inlet and outlet openings one of its constituents is continuously removed by absorption necessarily a reduction of volume of gas in the tube system takes place, and this causes an increase of suction in the tube system, and consequently a decrease in effective suction in the chamber connected with the outlet end of the tube system. Hence the velocity of the gas through the inlet-opening increases and the velocity of the gas through the outlet-opening decreases until the same quantity of gas enters through the inlet as is absorbed, for example, by a suitable chemical reagent in the tube system plus that which passes out through the outlet-opening. Thus every change in the volume of the constituents absorbed from the gas causes a corresponding change of suction in the tube system. Thus if two manometer-tubes are in communication, respectively, with the tube system—that is, that part of the tube system between the two fine openings and the chamber communicating with the outlet-opening—the column in the manometer connected with the said chamber indicates the constant suction in said chamber, and the column in the manometer connected with the tube system indicates the varying suction in said tube system, and thus indicates the amount or percentage of the constituent that has been absorbed—that is, the amount or percentage of such constituent contained in the gas under observation.

The upright vessel A, which is liquid and air tight and preferably cylindrical in shape, is closed at the top and bottom and is connected at its bottom by a pipe A′, having a cock A², with a waste-pipe B to permit of drawing the water from this vessel A in case this becomes necessary.

A tube C, open to the atmosphere at its upper end, extends from the top of the vessel A to within, say, two inches from the closed bottom of the vessel—that is, to the horizontal plane $x\ x$—and said tube is also open at its lower end.

A tube D extends through the top of the vessel A and down through the vessel to the horizontal plane $z\ z$, which is, say, six inches above the plane $x\ x$.

Two manometer-tubes E and E′ have their lower ends immersed in a vessel E², containing water and placed on substantially the same level with the bottom of the vessel A, and of said tubes E and E′ the tube E is connected by a suitable coupling with the top of the vessel A, so as to be in communication with the upper part of the interior of said vessel, and the tube E′ is connected by a suitable coupling with the tube D, so as to be in communication with the same above the top of the vessel A.

A tube F, open at its lower end, extends through the top of the vessel A to a horizontal plane $y\ y$ fifty-four inches above the plane $x\ x$.

A tube G, having a cock G′, extends from the top of the vessel A to an aspirator G² of any approved construction and provided with a steam-supply pipe G³, so that by means of said aspirator suction can be produced in the vessel A.

The aspirator G² discharges its exhaust-steam into a pot H, connected with the waste-pipe B, and said pot contains two coiled pipes J and K, in one end of each of which a platinum cap is fastened, said two caps $a$ and $b$ each having a fine aperture about $\frac{8}{1000}$ (eight one-thousandths) of an inch in diameter. These disks thus form contractions in the pipes or tube system. That end of the coiled pipe K containing the apertured disk $b$ is connected with the upper end of the tube F previously described, which tube has a cock F′.

The tube D is provided above the top of the vessel A with a branch pipe D′, to which is coupled the conveying-tube for conveying gas under examination to the apparatus, and said branch pipe contains a filter D² of any improved construction.

A platinum disk $e$, with a fine aperture about $\frac{1}{64}$ (one sixty-fourth) of an inch in diameter is located in the branch pipe D′, and through said aperture the gas is drawn into the apparatus.

The tube D is continued to the lower end of a cylindrical vessel L, preferably made of glass and adapted to contain a quantity of chlorid of calcium, which absorbs the moisture contained in the gas, and the upper end of the vessel L is connected by the tube L′ with that end of the coiled tube J opposite the one containing the apertured disk $a$, a filter L² of any approved construction being interposed between the adjacent ends of the tubes J and L′, as shown. The moisture in the gas passing through the vessel L dissolves some of the calcium chlorid in said vessel, and this solution trickles down the outlet-pipe M connected with the bottom of the vessel L and sealed at its lower open end by a suitable vessel M′ containing water.

That end of the coiled tube K opposite the one containing the apertured disk $b$ is connected by means of an interposed filter N² with a tube N′, the other end of which is in communication with the upper end of a cylindrical vessel N, adapted to contain calcium chlorid for drying the gas, which vessel N also has an outlet-pipe O, through which the solution of calcium chlorid trickles, the bottom open end of said outlet-pipe O being sealed by a vessel O′ containing water.

That end of the coiled tube J containing the apertured disk $a$ is connected by a tube I with the lower end of an absorption vessel R.

The tube N′ is connected with a manometer-tube P, sealed at its lower open end by means of a vessel P′ containing water, and the tube P is secured upon a suitable scale board or plate P², on which are produced marks or graduations indicating the percentages of the constituent of the gas that is to be determined—that is, these graduations show the tension in the tube P corresponding to the elimination of a certain quantity of the constituent to be determined from the gas under treatment. The tube N′ is also connected by a tube Q with a recording device Q′ of any approved construction for producing a permanent record of the variations in tension of the gas passing through the apparatus.

The lower end of the vessel N is connected by a tube R′ with the upper end of the cylindrical absorption vessel R, which is filled with broken pieces of glass, beads, or like material to give an increased percolating surface. An outlet or drip pipe S is connected with the bottom of the vessel R, and its lower open end is sealed in a vessel S′, having a discharge-spout S² for conducting the drip into a larger vessel S³ for facility of removal of the drippings.

A tube T, connected with the pot H, terminates in a coil and a nozzle T′, directly above a knife-edge ridge U on the upper surface of a flat vessel U′, which by means of the screws U² can be adjusted laterally, so that the knife-edge is centrally below the nozzle T′ or more or less to one side of the center of the same, as may be desired or necessary. The exhaust-steam passing from the pot H through the pipe T condenses, and the water of condensation drops from the nozzle T′ upon the knife-edge U, and thereby is divided into two portions, which flow into the two shallow compartments formed at the two sides of the knife-edge ridge, and flow from these compartments through the tubes V³ and V⁴ into the two compartments V' and V² of a vessel V, having a pocket V⁵ formed below its bottom into which a piece $d$ of caustic soda or potash is placed. The water flows through the bottom outlet $e'$ of the compartment V' into the pocket V⁵ and rises in the same, and finally flows through the bottom opening of the compartment V² into said compartment. Thereby the water dissolves part of the stick or piece $d$ of soda or potash, so that a solution of caustic potash or soda passes into the compartment V², where it is diluted by the water passing into the compartment V² through the tube V⁴. From the compartment V² the diluted solution flows into the tube X, closed at the bottom and connected at its upper end with the bottom of the compartment V². A fine tube X' extends from the bottom of the tube X to the top of the absorption vessel R, and the potash solution passes drop by drop from the tube X' into said absorption vessel R. The solution percolates over the broken glass or beads in the vessel R and takes up all the carbon dioxid contained in the gas passing upward through said vessel.

The tube X forms a liquid seal and prevents air entering through the tubes into the tube system through which the gas is conveyed.

As the salts of soda or potash are apt to creep up in the tube I and to clog the same, means are provided for washing them down. These preferably consist of a tube Y, bent U-shaped and entering the tube I at Y', and into which tube Y water of condensation passes from the pot H through pipe Y³. The water of condensation rises in that leg of the tube Y connected with the tube I at Y' and flows into the tube I, dissolving and carrying along the salts that have accumulated, thus thoroughly preventing clogging of the tube I.

The manometer tube E indicates the degree of exhaustion in the space D in the vessel A, as the suction in both is the same, the upper end of the tube E being connected with the upper end of vessel A, and the manometer tube E' shows by means of the water column in said tube the suction in the tube system at the gas-inlet end of said tube system. In the case shown the suction is equal to six inches of water—that is, equal to that required to raise and maintain a column of water at an elevation of six inches.

In order to convey the gas through the apparatus, the tension of the gas must be greater at the inlet end of the tube system than at the outlet end, whether the gas be conveyed by suction, as in the apparatus shown, or by pressure, which is possible with some modifications of the apparatus. If the gas at the inlet end has a tension greater than that of the atmosphere—that is, if it is under pressure—the tension at the outlet end must be less, but still may be greater than that of the atmosphere, in which case the gas at the outlet end would still be under pressure, which pressure, however, must be less than the pressure at the inlet end. With the gas under pressure at the inlet end it may be under suction at the outlet end, as thus also the required difference in tension is obtained, or the gas at the inlet end may have a tension less than that of the atmosphere, in which case it would be under suction, and in that case the tension of the gas at the outlet end would have to be to a greater extent less than the atmosphere tension—that is, the suction at the outlet end must be greater than the suction at the inlet end; but not only must the tension of the gas at the outlet end be less than the tension at the inlet end, but this difference in tension must remain constant, which is best obtained by keeping the respective tensions at the inlet and outlet ends constant.

The apparatus shown when in operation by suction has atmospheric pressure at the level $x$ $x$ in the vessel A, because all the water has been drawn by suction out of the tube C, which is connected with the atmosphere. At the level $z$ $z$ the pressure is less than the atmospheric pressure to such an extent that the atmosphere can raise a column of water to the height of six inches against this reduced pressure—that is, there is a suction of six inches of water. At the level $y$ $y$ there is a pressure less than the atmospheric to such an extent that the atmosphere can raise a column of water to the height of fifty-four inches against this reduced pressure—that is, there is a suction of fifty-four inches of water. As the gas entering the tube system at the branch pipe D' is subjected to the constant suction of six inches of water and the gas leaving the tube system at the lower end of the tube F is under a constant suction of fifty-four inches there will be a constant difference in suction—that is, in the tension of the gas at the inlet and outlet ends of the tube system—corresponding to the difference between fifty-four inches of water and six inches—that is, there will be a constant difference in tension of forty-eight inches of water. As the aperture in the pipe D'—that is, the contraction thus formed—is only one sixty-fourth of an inch, the atmospheric pressure cannot enter the pipe D' rapidly enough to affect the pressure at the end of the pipe D. The aperture is of such size that more gas will pass through it than is required for analysis, and the excess escapes at the lower end of the pipe D and bubbles up through the water into the upper part of the vessel, from which it is drawn by the aspirator G² and discharged into the pot H.

The operation is as follows: As soon as steam is admitted to the aspirator G² a suction is at once created in the regulator A, which suction increases until the air drawn in through the tube C bubbles up from the lower end of the same through the water in the regulator and is then drawn off by the aspirator. The cock G' is so adjusted that the air bubbles up from the lower end of the tube C moderately without much disturbing the water in the regulator A. This causes a constant suction in the tubes D and F of six and fifty-four inches of water-head, respectively. The constant suction, equal to a column of water of six inches, in the tube D draws in the gas through the aperture *e*, and the excess of gas of the amount required escapes through the lower end of the tube D and bubbles up through the water in the regulator. The suction of fifty-four inches of water column in the tube F draws the gas through the apparatus, the gas passing from the tube D to the vessel L, in which it is thoroughly dried by the calcium chlorid. It is then drawn through the tube L' and filter L² into the coiled tube J in the pot H, in which a constant temperature of 212° Fahrenheit is maintained by the exhaust-steam from the aspirator G², and is drawn through the fine aperture in the platinum cap *a* in the coiled tube J, and is drawn from the same through the tube I into the vessel R, in which it rises and in which it is deprived of its carbon dioxid, which is taken up by the solution of caustic soda or potash percolating down through said vessel R. From the upper end of the vessel R the gas is drawn through the tube R' to the bottom of the vessel N, in which it is again dried by the calcium chlorid, and then it is drawn through the tube N' and filter N² into the coiled tube K in the pot H, which coiled tube K is also at a constant temperature of 212° Fahrenheit, and then passes through the second fine aperture *b* and into the tube F, through which it is drawn into the water in the vessel A. It bubbles up through the water and is drawn off by the aspirator G². The gas is subjected to the action of the soda or potash after it has passed through one aperture and before it passes the second aperture and is thus perfectly free from carbon dioxid. The variations in the tension during passage in the tube system between two apertures influence the liquid in the manometer-tube P, and thus show the percentage of carbon dioxid removed on the scale P², and such variations also influence the recording device Q', which may be of any well-known or suitable construction to cause the same to draw a line, clearly showing the variations in tension, and consequently the varying percentages of carbon dioxid present. The gas, being thoroughly filtered before passing the apertures *a* and *b*, cannot clog or otherwise injuriously affect the same, and as the gas is dry when passing through the tubes J and K at a normal temperature of 212° there is no possibility of the indications being rendered inaccurate by the action of this temperature on moisture that might be mixed with the gas if the latter had not been dried.

Having described our invention, what we claim as new, and desire to secure by Letters Patent, is—

1. In an apparatus for determining the constituents of gases, the combination with a tube system, having two contractions forming two fine apertures through which the gas is conveyed, means for maintaining that part of the tube system provided with the contractions at a constant temperature, an indicator for showing the tension of the gas in that part of the tube system between the two contractions and means for conveying the gas through the tube system at a constant difference between the tension of the gas at the inlet and outlet ends of the tube system, and means for containing a substance which absorbs one or more constituents of the gas, substantially as herein shown and described.

2. In an apparatus for determining the constituents of gases, the combination with a tube system having two contractions forming two fine contractions, through which the gas is conveyed, a vessel in which those parts of the tube system adjacent to the apertures are located, means for admitting exhaust-steam into the said vessel, an indicator for indicating the variations in tension of the gas in that part of the tube system between the contractions and means for conveying the gas through the tube system at a constant difference in tension of the gas at the inlet and outlet ends, of the tube system and means for containing a substance which absorbs one or more constituents of the gas, substantially as herein shown and described.

3. In an apparatus for determining the constituents of gases, the combination with a tube system, having two contractions forming two fine apertures through which the gas is conveyed, a vessel surrounding those parts of the tube system provided with the contractions, an indicator for indicating the variations in the tension of the gas in that part of the tube system between the contractions, a closed vessel connected with the tube system, an aspirator connected with the closed vessel and discharging into the vessel surrounding that part of the tube system provided with the contractions and means for containing a substance which absorbs one or more constituents of the gas, substantially as herein shown and described.

4. In an apparatus for determining the constituents of gases, the combination with a tube system having two contractions forming two fine apertures through which the gas is conducted, a manometer, a gas-drying device and an absorption vessel connected with that part of the tube system between the two contractions, and a device for causing the gas to flow through the tube system with a constant difference in the tension of the gas at the inlet and outlet ends of the tube system, substantially as herein shown and described.

5. In an apparatus for determining the constituents of gases, the combination with a tube system having two contractions forming two fine apertures through which the gas is conducted, a gas-drying device connected with said tube system, in advance of one contraction, and an absorption vessel, a gas-drying device and a manometer connected with that part of the tube system, between the two apertures, and a device for causing the gas to pass through the tube system with a constant difference between the tension of the gas at the inlet and outlet ends of the tube system, substantially as herein shown and described.

6. In an apparatus for determining the constituents of gases, the combination with a tube system having two contractions forming two fine apertures through which the gas is conducted, vessels connected with the tube system and serving to receive substances for drying the gas passing through the vessels, drip-pipes for said vessels, liquid seals for the lower ends of said drip-pipes, an absorption-chamber and manometer connected with the tube system, and a device for causing the gas to flow through the tube system with a constant difference between the tension of the gas at the inlet and outlet ends of the tube system, substantially as herein shown and described.

7. In an apparatus for determining the constituents of gases, the combination with a tube system, of an absorption-chamber in said tube system, means for admitting water into the tube system adjacent to the lower end of the absorption-chamber and means for conveying the gas through the tube system, substantially as herein shown and described.

8. In an apparatus for determining the constituents of gases, the combination with a tube system and means for conveying gases through the system, of an absorption-chamber in said tube system, means for admitting a solution into the top of the absorption-chamber, and means for admitting water into that part of the tube system through which the gas is conducted to the absorption-chamber, adjacent to the lower end of said chamber, substantially as herein shown and described.

9. In an apparatus for determining the constituents of gases, the combination with a regulating device composed of a closed vessel, a tube open at the top to the atmosphere and extending to near the bottom of the vessel, a tube system through which the gas is conducted, two tubes connected with the two ends of the tube system and extending down into said closed vessel, the lower ends of said two tubes being vertically from each other a distance equal to the difference in height between water columns that it is desired the suction shall maintain, a suction device connected with the top of the closed vessel, substantially as herein shown and described.

10. In an apparatus for determining the constituents of gases, the combination with a closed vessel, of a tube system through which the gas is conveyed, two tubes extending from the ends of the tube system into said closed vessel the longer tube being connected with the inlet end of the system and the shorter one with the outlet end, an aspirator connected with the vessel, and a tube open to the atmosphere at its upper end and extending to near the bottom of the vessel, substantially as herein shown and described.

11. In an apparatus for determining the constituents of gases, the combination with a closed vessel, of a tube system through which the gas is conveyed, two tubes extending from the tube system into the vessel, the longer tube being connected with the inlet end of the tube system, and the shorter tube with the outlet end of the system, a tube open to the atmosphere at its upper end extending through said vessel to near the bottom of the same, an aspirator, a manometer-tube connected with said vessel and a manometer-tube connected with the inlet end of the tube system, substantially as herein shown and described.

12. In an apparatus for determining the constituents of gases the combination with a closed vessel, of a tube system, connected with this closed vessel and through which tube system the gases under observation are to be conveyed; a pot surrounding part of said tube system, a pipe connecting the pot with the closed vessel, an aspirator connected with the said pot, an outlet-tube for part of the exhaust-steam, which outlet-tube is connected with said pot, an absorption-chamber in said tube system, means for conducting the water for condensation from said outlet-tube to the absorption-chamber on the tube system, substantially as herein shown and described.

13. In an apparatus for determining the constituents of gases, the combination of a tube system connected having two contractions forming two fine apertures, and through which tube system the gas under observation is to be conveyed, means for conveying gas through the tube system by suction, gas-drying vessels and an absorption vessel connected with the tube system, a manometer-tube for showing the suction in the suction device, a manometer for showing the suction in that part of the tube system between the contractions, a tube for conveying a solution to the absorption vessel, which solution-supply tube is sealed by a liquid, to the atmosphere, substantially as herein shown and described.

In testimony that we claim the foregoing as our invention we have signed our names, in presence of two witnesses, this 28th day of March, 1898.

ALFRED STEINBART.
EDWARD A. UEHLING.

Witnesses for Alfred Steinbart:
 OSCAR UEHLING,
 WILLIAM HENRY DAVIS.
Witnesses for E. A. Uehling:
 OTTO E. TRAUDT,
 OSCAR UEHLING.